Patented Nov. 8, 1938

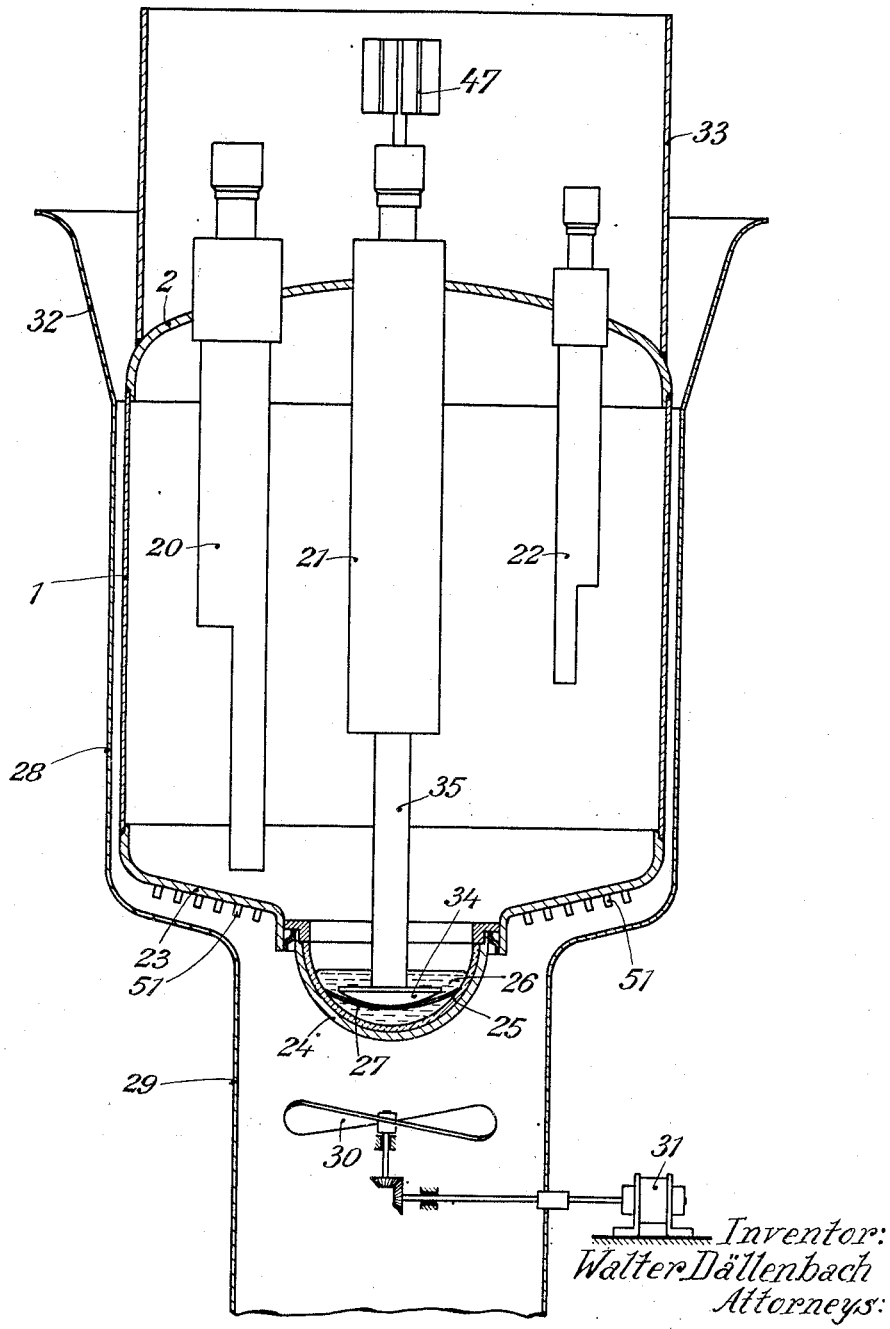

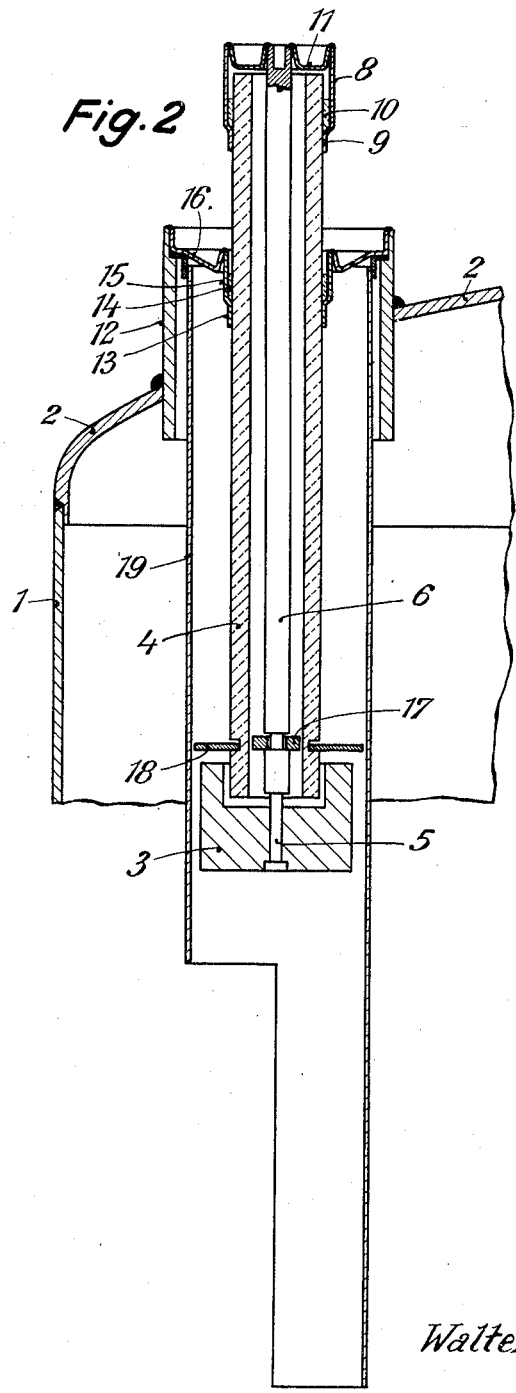

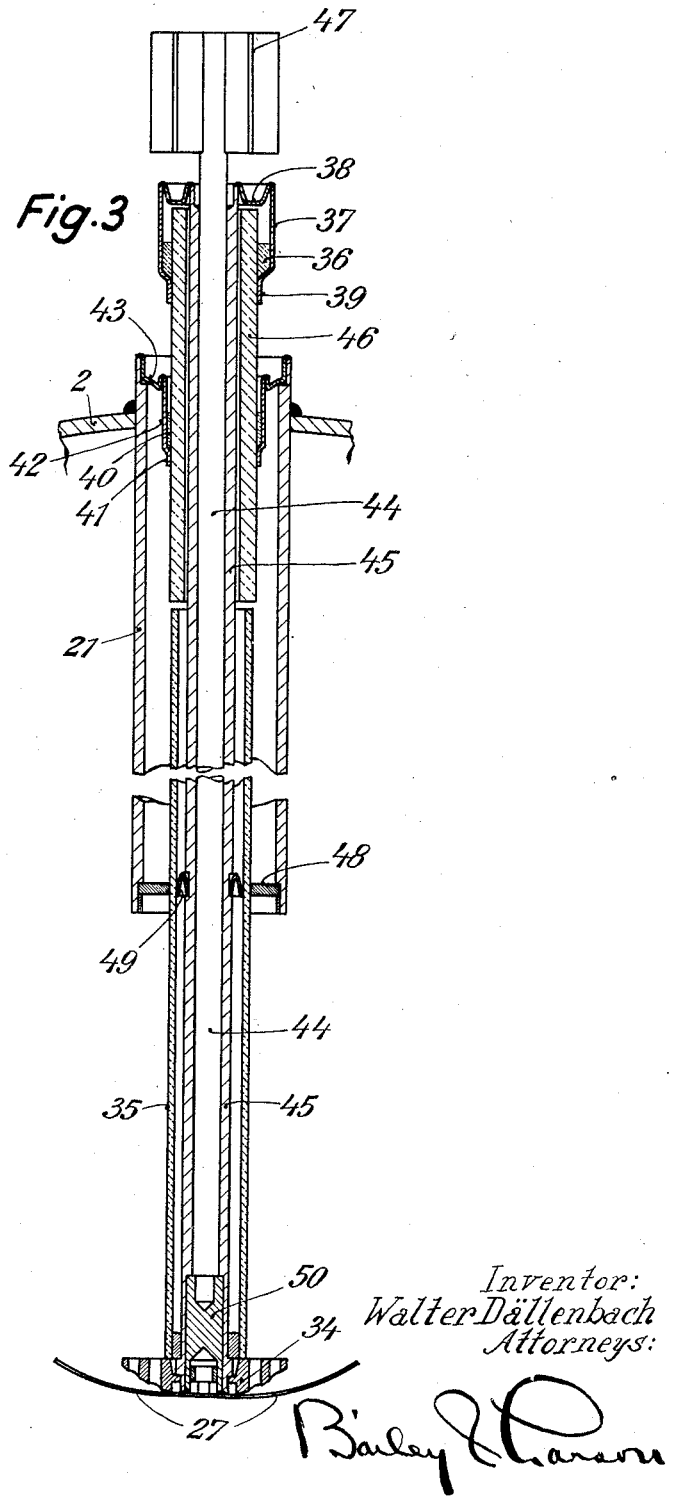

2,135,883

UNITED STATES PATENT OFFICE 2,135,883

ELECTRIC DISCHARGE APPARATUS

Walter Dällenbach, Berlin-Charlottenburg, Germany

Application December 31, 1935, Serial No. 57,058
In Germany January 4, 1935

6 Claims. (Cl. 250—27.5)

The invention relates to vacuum discharge apparatus, e. g., mercury vapour rectifiers, converters or inverters, with a metallic vacuum vessel consisting of a number of wall-sections welded together which is tight to high vacuum and has been de-gassed at high temperature before being permanently disconnected from the vacuum pump.

It is known that such vacuum apparatus with permanent disconnection of the vacuum vessel from the pump is capable of continuous operation only if care is taken that no free hydrogen ions originating from the cooling medium serving for cooling the vessel penetrate into the interior of the vessel to occasion a deterioration of the vacuum which endangers the operation. Exhaustive investigations have shown that free hydrogen ions such for example as are always present in large quantity in the cooling water at the temperatures involved, have the capacity at the working temperatures of a vacuum apparatus which lie in the order of magnitude of about 100° C. of diffusing through the kinds of iron and steel customarily employed as the material constituting the walls, the hydrogen ions then emerging from the walls as hydrogen gas. As already mentioned this gives rise to a deterioration in the vacuum which occasions striking back and other interruptions in the operation of the apparatus and which cannot be rectified due to the permanent disconnection of the vessel from the pump.

For cooling the vessel it has been proposed to employ cooling liquids which contain or yield no free hydrogen ions. Such a cooling liquid is benzol for example.

By using such cooling liquids it is in fact possible to avoid with certainty a deterioration of the vacuum due to the taking up of hydrogen ions from the cooling medium but in some circumstances, e. g., for small discharge apparatus, the use of a cooling liquid as cooling medium is not desirable, for reasons of expense for example.

According to the invention the cooling of a vacuum apparatus of the above mentioned kind is materially cheapened in that instead of using a cooling liquid which is free from or does not yield hydrogen ions, the apparatus is cooled by a gaseous medium, more particularly air.

In itself the use of air-cooling in vacuum discharge apparatus with a glass vessel or a metal vessel connected to a vacuum pump is already known. In view of the above-mentioned physical phenomena however it had to be assumed in the art that air could not be used for vacuum discharge apparatus with metal vessel operated without a pump, namely, for the following reasons:

It is known in vacuum technics that when a metallic, particularly an iron, vacuum vessel is heated for the first time a considerable quantity of water vapor is given off in the vacuum as soon as temperatures of about 200° C. are attained. This water vapor, before being driven off by the heat, is adsorbed as a fluid (liquid) layer on the surface of the vessel. If the thickness of this liquid layer is calculated from the quantity of water vapor given off there will be layer thicknesses of 50 to some 100 molecule diameter. In this liquid layer the same proportion of molecules is obviously dissociated in hydrogen ions and hydroxyl ions as in liquid water, a percentage which, as known, increases exponentially with increasing temperature. It is also well known that when the said water film is removed from the metallic surface by heating, and this surface is cooled and exposed to atmospheric air it takes up the water vapor always present in the atmospheric air like a compressed sponge, so that in a short time the water layer driven out by the heat again forms. It must hence be assumed that, in atmospheric air and the use of atmospheric air, not artificially dried by a special auxiliary means, as a cooling medium, hydrogen ions penetrate into the interior of a vacuum vessel, as when water is used for a cooling agent, if the supply of water vapor from the atmosphere is sufficient to compensate for the losses undergone by the adsorbed water film through the diffusion of the hydrogen ions in the interior of the vessel. The supply of hydrogen from the atmosphere is shown by the following approximate calculation:

In hot summer weather calculation must be made on temperatures of the cooling air supplied at least up to 38° C. If this air is saturated with water vapor—a state often corresponding to practical conditions—it contains 49.69, thus in round numbers, 50 mm. mercury column water vapor.

$$z = 3.535 \cdot 10^{22} \frac{p}{\sqrt{\mu T}} \text{cm}^{-2} \text{ sec}^{-1}$$

molecules strike against a surface of 1 cm² per second, wherein $p$ designates the pressure of the type of gas involved in mm. Hg columns, $\mu$ their molecular weight and T the absolute temperature. If in the present case we calculate $p = 50$
$\mu = 18$ for water and
$T = 273 + 38 = 311°$ absolute we will have $$z = 2.35 \cdot 10^{22}$$

This number of water vapor molecules passed from the exterior to the liquid layer is now to be compared with the number of hydrogen ions which are given off through the iron walls of a vacuum vessel in the vacuum. According to the E. T. Z. (Elektrotechnische Zeitschrift) 1935, page 85 et seq., particularly page 87, left column, the quantity of hydrogen diffused in the vacuum amounts to 0.277 cm³ mm. Hg/cm²h. If we calculate with 2.7·10¹⁹ molecules per cm³ at atmospheric pressure and room temperature the above given diffused quantity corresponds approximately to a number of $$z' = 0.277 \cdot \frac{2.7 \cdot 10^{19}}{760} \cdot \frac{1}{3600} = 3 \cdot 10^{12}$$

hydrogen molecules per cm² and second, that is, a number which is about $10^{10}$ times less than that supplied from the atmosphere to the water film. Therefore, it cannot be expected that the water film (or layer) which is adsorbed by the hydrogen diffusion at the interior of the vessel will be consumed or even appreciably decreased, that is, the water film on the surface forms a practically inexhaustable reservoir for hydrogen ions.

The following approximate calculation shows that the diffused hydrogen quantity of 0.277 cm³ mm. Hg/cm²h at 90° operative temperature, as stated, plays a considerable part in mercury vapor rectifiers with metallic vacuum vessel.

Assume that the rectifier vessel consists of a receptacle in cubic form of 1 meter edge length which, by its entire surface of $6 \cdot 10^4$ cm² is immersed in water at 90°: there is therefore in this receptacle of $10^6$ cm³ content an hourly increase of pressure of $$\frac{0.277 \cdot 6 \cdot 10^4}{10^6} = 1.662 \cdot 10^{-2} \text{mm. Hg}$$

The quantities of hydrogen penetrating into the vacuum vessel in the course of a year would be $24 \cdot 365 = 8760$ times greater. The yearly pressure increase thus amounts to $1.622 \cdot 10^{-2} \cdot 8760 = 145$ mm. Hg.

It is thus apparent that the calculated deterioration of the vacuum is so great that premature ignition and other disturbances can take place within a short time.

Consequently it was necessary in the first place to assume with justification that the use of air as cooling agent would be impossible in the present case.

Nevertheless, experiments have shown that air is actually a suitable cooling agent. This can be attributed primarily to the fact that under the influence of the discharge hydrogen ions are driven out from the interior of the vessel to a greater extent than they can penetrate by diffusion; the metal of the walls of the vessel thus acts as a getter. The effect of the discharge is further supported in that for reasons not yet elucidated the diffusion of the positive ions from the film of water adsorbed at the walls is prevented. In any case the quantity which diffuses is smaller than the computed quantity.

In practice the actual cooling is effected by surrounding the vessel with a cooling jacket in known manner. This jacket may be closed or may consist of individual guide surfaces. At those parts of the vessel where a preferential cooling is to be effected, provision must be made for increasing the speed of the cooling current or else separate impact surfaces must be provided.

As a film increasing in thickness in the direction of flow forms on a surface to be cooled over which the cooling air current passes parallel to the surface, this film adhering to the surface and occasioning a considerable diminution in the transfer of heat, it is advisable to make the surface of the impact surfaces short in the direction of motion of the cooling medium, so that the film forming on the surface breaks away and mixes with the remaining cooling air due to turbulence.

The present invention makes it possible to construct even vacuum discharge apparatus for average and small output i. e., for loads less than about 500 amperes, as metal apparatus. Hitherto apparatus for such loads, e. g., rectifiers, have invariably been constructed with a glass vacuum vessel i. e., glass rectifier. Vacuum vessels of glass have the advantage that after being evacuated they can be sealed off from the pump and then are entirely high vacuum-tight so that no separate pump equipment which is expensive is required. At the same time however the glass rectifier has various disadvantages which arise from the nature of glass. The glass rectifier is very sensitive to shocks and in particular the anode arms readily break off. In accordance with its construction the rectifier has a considerable number of such anode arms, e. g., three, six or twelve. In addition there are the arms for the exciter anodes, the striking electrode and so on. On the other hand the complicated shape of the rectifier vessel more particularly the known pear-shaped enlargement serving as cooling space, is involved by the working conditions because it is necessary for avoiding striking back and other disturbances.

Apart from its fragility such a complicated glass vessel is also very expensive to make. It is therefore customary to house it in a framework or a container of considerable size. In this way the space occupied is increased in an undesired manner and in addition the manipulation of the rectifier when positioning it in the framework or when exchanging it is very difficult.

The possibility of utilizing in an economical manner for small loads also for which hitherto glass rectifiers have been used, a metal rectifier with all its advantages such as strength and compactness does in fact represent a very material advance in the art; naturally however the invention is not to be regarded as limited to the load limit specified.

A vacuum discharge apparatus according to the invention comprises an entirely closed metallic vacuum vessel which is high vacuum tight and which prior to separation from the pump is degassed at a temperature of several hundred degrees centigrade, preferably at 300–400° C. The desired number of anodes, a liquid cathode as well as the other requisite electrodes or control grids, are introduced into this vessel. The lead-in arrangements are formed of insulating bodies of ceramic material, e. g., steatite, which directly carry the weight of the elements carrying the current and are connected thereto and to the wall of the vessel in a manner tight to high vacuum by means of a flux of glass, enamel or else metal sulphide. The discharge is caused to strike by means of a striking electrode movably mounted in the interior of the vessel for example and actuated by means of an electromagnet arranged outside the vessel.

As will be explained in greater detail in the subsequent description it is possible by means of a suitable method for testing the vacuum-tightness to produce a vessel which is practically absolutely tight to high-vacuum, so that the first requirement for enabling the vessel to be separated from the pump is satisfied.

The second requirement for separating the vessel from the pump is that the walls of the vessel can be fully de-gassed before the apparatus is set in operation. For this purpose it is necessary to heat the vessel to temperatures of about 300–400° C. Such a considerable heating is not possible with a vessel equipped with the lead-in arrangements hitherto known because the sealing materials employed in these lead-in arrangements cannot withstand these temperatures. By the use of a flux of glass, metal sulphide or the like in accordance with the present invention it is possible to obtain between insulating body and the adjoining metal elements a connection which is absolutely tight to high vacuum and is directly capable of withstanding the temperatures requisite for de-gassing, so that the walls of the vessel can be entirely de-gassed so that the second requirement for separating the vessel from the pump is also satisfied.

In some circumstances the elements disposed in the interior of the vessel need not be made of special de-gassed iron fused in vacuo and thus very expensive but these parts can be made from ordinary iron which has not been de-gassed, graphite or the like. It has been found that if they are kept at temperatures below about 250° C. the walls of the vessel are capable of taking up and retaining the gases released in the interior of the vessel.

The invention will be described in greater detail with reference to the accompanying drawings.

Fig. 1 is a general view of a rectifier such as a mercury vapour rectifier with artificially cooled metallic vacuum vessel separated from the pump and electrode lead-in arrangements, Fig. 2 is an anode lead-in arrangement and Fig. 3 a cathode lead-in arrangement.

In the rectifier shown in Fig. 1 the vacuum vessel is assembled by welding together the parts 1, 2, 23 and 24. The entire vacuum vessel consists for example of iron and after assembly is subjected to a test for vacuum-tightness. This testing may for example be effected by filling the vessel with a chemically active gas such as ammonia and applying to the outside a reagent such as mercurous nitrate. Leaks are directly indicated by a colouration of the mercurous nitrate. After testing for vacuum tightness, the entire vessel is de-gassed at a temperature of 200° C. or more, preferably 300–400° C., and is disconnected from the vacuum pump. It has been found in practice that it is necessary to de-gas at such high temperatures if the vessel is to be operated without subsequent pumping. A number of main anodes 20 constructed as in Fig. 2 are introduced through the top 2 of the vessel and are arranged in a circle for example. An exciter anode 22 is shown on the right-hand side of Fig. 1 and its construction may also correspond to the arrangement shown in Fig. 2. In the case of a rectifier having six anodes it is preferable to provide three exciter anodes which are advantageously arranged in such manner that an exciter anode follows two main anodes. A current lead-in arrangement 21 as in Fig. 3 is provided at the centre of the cover of the vessel. The member 34 of this lead-in arrangement dips into the mercury cathode 26 which is contained in a bowl 25 of insulating material, e. g., quartz.

In the rectifier shown in Fig. 1 cooling is effected by means of a fan 30 arranged beneath the cathode and driven by a motor 31. This fan draws a stream of gaseous cooling agent, e. g., air, through a cooling jacket 28 which surrounds the vessel and is continued at the bottom in a shaft 29 while at the top it has an outwardly flared portion 32. The air current is preferably directed from the top downwardly. At those parts of the vessel which have to be cooled particularly strongly, impact surfaces which are of short extent in the direction of flow can be provided, e. g., in the form of bars 51. The degree of cooling is preferably so chosen that the temperature of the vessel lies between 70 and 90° C., preferably between 85 and 90°. A protecting cowl 33 which can also be employed to support a switchboard device for operating the rectifier is mounted on the outside of the vessel to guide the current of cooling air and to prevent contact with the electrode connections or with elements carrying a current.

As seen from the drawings the rectifier constitutes a device in cylindrical form which is simple to manipulate and non-fragile and in which there are no fragile glass arms such as are customary in a glass rectifier to prevent striking back. In addition the rectifier according to the invention is superior to a glass rectifier in that it has a practically unlimited life.

The above-described air-cooling is particularly suitable for rectifiers for currents up to about 500 amperes but it can also be employed with advantage in some circumstances with larger rectifiers.

In Fig. 2, 1 is the central cylindrical wall portion of the metallic vacuum vessel containing the discharge path, 2 is the cover of the vessel and 3 is the actual anode body which is carried by the metal rod 6 consisting of iron for example. The anode body 3 is secured to the current carrying conductor 6 by means of a molybdenum pin 5 which fits in a bore in the anode. The metal rod 6 is surrounded by an insulating tube 4 of ceramic material e. g., steatite which extends into the immediate vicinity of the rear side of the anode 3 and may engage in a recess in the anode. To produce the high vacuum-tight connection between the insulating tube 4 and the anode rod 6 or the cover 2, two sleeves 8 and 15 are positioned on the insulating tube 4 and comprise extensions 9 and 13 which lie closely against the wall of the insulating tube so as to form pockets open at the top. A glass ring or a glass tube is inserted from the top into each pocket and is then fused. In this way a relatively broad glass ring 10 or 14 is obtained between the steatite tube and the metal sleeve 8 or 15. Instead of a glass flux any other suitable flux can be employed, e. g., enamel, iron sulphide or the like. Further the pockets can be filled by simply pouring in molten material. In any event the material for the flux should be so chosen that its coefficient of expansion corresponds as closely as possible and in any case is within $1.10^{-6}$ of the coefficient of expansion of the insulating tube 4 of steatite. Also the material for the sleeves 8 and 15 should be so chosen that its coefficient of expansion is close to that of the flux and steatite or else is somewhat greater so as to give a shrinking effect. The free end of the sleeve 8 is connected with the electrode rod 6 in a manner tight to high vacuum, e. g., welding, either directly or with the interpositioning of a resilient metal element 11. The free end of the sleeve 15 is welded in a similar manner to the cover 2 either directly or by means of an elastic metallic disc 16. In the embodiment shown the welding is not effected directly to the wall of the vessel but the disc 16 is secured to the upper end of a tube 12 by welding, this tube itself being welded to the cover 2. The electrode lead-in arrangement is thus mounted in an elastic manner in the tube 12 to which in addition an anode protecting tube 19 is secured by means of an angular member.

The material for the elastic members 11 and 16 is also preferably so chosen that its coefficient of expansion corresponds to that of the sleeves, the flux and the insulating tube. If the membrane-like members 11 and 16 are made from ordinary iron or steel, then the sleeves 8 and 15 are made so long that the points at which they are welded to the membranes 11 and 16 are so remote from the glass fluxes 10 and 14 that the elastic deformations originating at the points of welding due to the difference in the coefficients of thermal expansion of the individual parts, do not reach the glass fluxes.

To prevent the heavy electrode from moving horizontally for any reason, e. g., during transport, which motion might damage the seal, a disc 17 which supports the electrode within the insulating tube is inserted in a recess in the electrode rod. In a similar way a further disc 18 which prevents the entire insulating tube together with the electrode from moving horizontally within the anode tube 19, is inserted in a recess in the insulating tube 4.

The cathode lead-in arrangement shown in Fig. 3 is in principle the same as the anode lead-in arrangement of Fig. 2. The electrode rod is indicated by 44. At its upper end it carries cooling surfaces 47 and at its lower end it is provided with a member 34 which is equipped with bores to enlarge the contact surface. Provided on the member 34 are springs 27 which bear against the bowl containing the cathode mercury. The electrode rod 44 consists of copper and to protect it against the mercury it is surrounded by an iron tube 45. At its lower end the rod 44 is hard-soldered to the iron plug 50. This plug 50 is welded to the lower end of the iron tube 45. Here also the entire current-carrying conductor is preferably enclosed in the insulating tube 46 which advantageously consists of steatite. The elastic members 38 and 43 serve for connecting the conductor 44, 45 and the cover 2 to the insulating tube 46. They are welded on the one hand to the upper end of the iron tube 45 and to the wall 2 and on the other hand to the sleeves 37 and 42. These sleeves have extensions 39 and 41 lying close against the wall of the insulating tube, so that as in the embodiment according to Fig. 2, pockets open at the top are formed which serve to receive the flux 36 and 40. In the embodiment shown in Fig. 3 the elastic member 43 is not fused directly to the wall of the vessel but is secured to a metallic tube 21 which in turn is welded to the wall of the vessel. Thus the entire lead-in arrangement is elastically mounted in the tube 21.

To prevent sparking the insulating tube is extended into the discharge space preferably by an amount at least equal to about the average separation between the two connections. The insulating tube 46 is then continued by a quartz tube 35 which extends down to the member 34. To prevent horizontal movement of the heavy lead-in arrangement, the quartz tube 35 is supported with respect to the metal tube 21 by means of an inserted disc 48. Further the iron tube 45 is held against movement within the quartz tube 35 by means of a spring ring 49 or by other supporting means.

I claim:

1. A mercury vapor rectifier comprising a metallic vessel composed of wall sections degassed at a high temperature ranging from 200° C. to 400° C., hermetically sealed for pumpless operation, and means for forcing a current of cooling gas on the outer walls of said rectifier.

2. A rectifier as in claim 1, and including a number of short pins welded to the walls of the vessel in the direction of the cooling gas agent, and at the points where preferential cooling is desired.

3. A mercury vapor rectifier consisting of a high vacuum-tight metallic vessel degassed at a temperature above 300° C. and hermetically sealed for pumpless operation, a cooling jacket spaced from and surrounding said vessel, and means for forcing a current of cooling gas between said vessel and jacket.

4. A mercury vapor rectifier consisting of a high vacuum-tight metallic vessel degassed at a temperature of several hundred degrees centigrade and hermetically sealed for pumpless operation, means for forcing a current of cooling gas on the outer walls of said rectifier, and anodes and a liquid cathode, said anodes and cathodes comprising conductor bars, ceramic insulating material surrounding and supporting said bars and being hermetically sealed to the walls of said vessel by means unaffected by the degassing temperatures.

5. The structure of claim 4, in which the ceramic material is steatite, and the hermetical sealing means is a glass flux.

6. The structure of claim 4, in which the sealing means includes two membrane-like metallic members each sealed to said ceramic material by means of a flux, and one being further secured to the conducting bar, and the other to the wall of the vessel, by welds.

WALTER DÄLLENBACH.